United States Patent
Ocker

[15] 3,688,837
[45] Sept. 5, 1972

[54] SCREW-TYPE HEAT EXCHANGER

[72] Inventor: Herbert Ocker, Leonberg, Germany

[73] Assignee: Werner & Pfleiderer, Stuttgart-Feuerbach, Germany

[22] Filed: July 9, 1970

[21] Appl. No.: 53,476

[52] U.S. Cl. .................................................. 165/87
[51] Int. Cl. ............................................... F28f 5/06
[58] Field of Search ................................. 165/87, 92

[56] References Cited

UNITED STATES PATENTS

| 3,506,066 | 4/1970 | Nonnenmacher | 165/87 |
| 3,486,740 | 12/1969 | Christian | 165/87 X |
| 1,987,707 | 1/1935 | Replogle | 165/169 X |

FOREIGN PATENTS OR APPLICATIONS 32,223    8/1885    Germany .................... 165/87

Primary Examiner—Frederick L. Matteson
Assistant Examiner—W. C. Anderson
Attorney—Hane, Baxley & Spiecens

[57] ABSTRACT

A screw-type heat exchanger has a shaft rotatably mounted within the drum of the heat exchanger. The screw turns of the screw of the exchanger are formed by a seamless tubular member spirally wound about the shaft and secured thereto. Several such screws may be rotatably mounted in the drum, parallel to each other and with the screw turns in mesh.

There is also disclosed a method of producing a screw as described for use in the heat exchanger.

7 Claims, 4 Drawing Figures

PATENTED SEP 5 1972　　　　　　　　　　3,688,837

INVENTOR.
HERBERT OCKER
BY Harris, Baxley and Spiecens
ATTORNEYS

SCREW-TYPE HEAT EXCHANGER

The invention relates to a screw-type heat exchanger and more particularly to a heat exchanger with a screw the turns of which are hollow.

BACKGROUND

Screw-type heat exchangers of the kind above referred to are used for a great variety of reactions in which supplying, dissipating and distributing of heat must be carried out. A major field of application for such heat exchangers is the preparation of substances used for producing synthetic plastics and the production of such plastics.

There are known heat exchangers of the general kind above referred to in which the hollow screw turns are formed by welding together open profiled components fixedly secured to a shaft. For instance, suitably profiled strips spirally wound upon the shaft and secured thereto are joined by welding along their radially outer edges thus forming screw turns within which a spirally shaped hollow space is defined by the walls of the strips and the respective peripheral wall portions of the shaft. Welded structures of this type as are now widely used have significant disadvantages. It is virtually impossible to prevent strains and stresses at the welds and such strains and stresses tend to cause a continuous working within the material at or near the welds. Stresses and strains as caused by the welding operations are particularly dangerous as the material forming the screw turns is exposed to additional tensions due to the temperature changes to which it is exposed when the heat exchangers in which the screws are installed, are in operation. Moreover, a spirally shaped welded joint or seam represents inherently a difficult configuration with respect to tensions, and the forces acting upon the screw turns and thus upon the welded joints are very high in many instances, for instance, when the heat exchangers are used in connection with the preparation of synthetic plastics. Production of hollow screw turns by welding together initially open components is made even more difficult due to the requirement that for operational reasons the welding joints or seams must be absolutely tight. Due to the aforeoutlined requirements and the technical problems, heat exchanger screws with hollow screw turns are very expensive in manufacture.

THE INVENTION

It is a broad object of the invention to provide a novel and improved heat exchanger screw which can be manufactured in a simple and comparatively inexpensive manner.

Another important object of the invention is to provide a novel and improved heat exchanger screw with hollow screw turns in which the heretofore used difficult welding operations are avoided and which are substantially free of strains and stresses in the material forming the screw turns.

It is also an object of the invention to provide a novel and improved method of producing screws with hollow screw turns which permits manufacture of hollow screw turns in a reliable manner and substantially free of internal strains and stresses and without requiring difficult and often unreliable welding operations.

SUMMARY OF THE INVENTION

The afore pointed out objects, features and advantages and other objects, features and advantages which will be pointed out hereinafter, are obtained by spirally winding about a shaft a seamless tubular member and then securing the turns of this member to the shaft. Modern technology is capable of producing seamless and absolutely tight tubes of any desired cross section at reasonable costs. As it is evident, forming of the hollow screw turns by winding such tubes about a shaft automatically eliminates all internal stresses and strains in the turns as are caused by welding together spirally shaped profiled strips. All difficult welding operations are eliminated; the only remaining welding operation is welding of the wound tubes to the shaft and such welding does not present any difficulties. It is, of course, also possible to secure the wound tubes to the shaft by suitable and conventional means other than welding.

An additional advantage of a heat exchanger screw according to the invention is that the hollow screw turns can be heated to a desired temperature, for instance, by circulating steam under high pressure through the screw turns and thus in a very economic manner. Seamless tubes can be placed under very high internal pressure without danger and difficulty. As a result, the invention provides a screw-type heat exchanger which is much sturdier and more reliable than heat exchangers of this type as heretofore available and which can yet be produced at much lower costs.

As previously stated, the seamless tubes may have any desired cross section such as a circular cross section, a rectangular cross section or a trapezoidal cross section.

For many purposes it is advantageous to mount two or more screws with hollow screw turns as previously described in a common drum. Such screws are mounted parallel to each other and with their turns in mesh, the rotational direction of the meshing screws being in the same sense.

DETAILED DESCRIPTION OF THE INVENTION

In the accompanying drawing several embodiments of the invention are shown by way of illustration and not by way of limitation.

Figure 1:
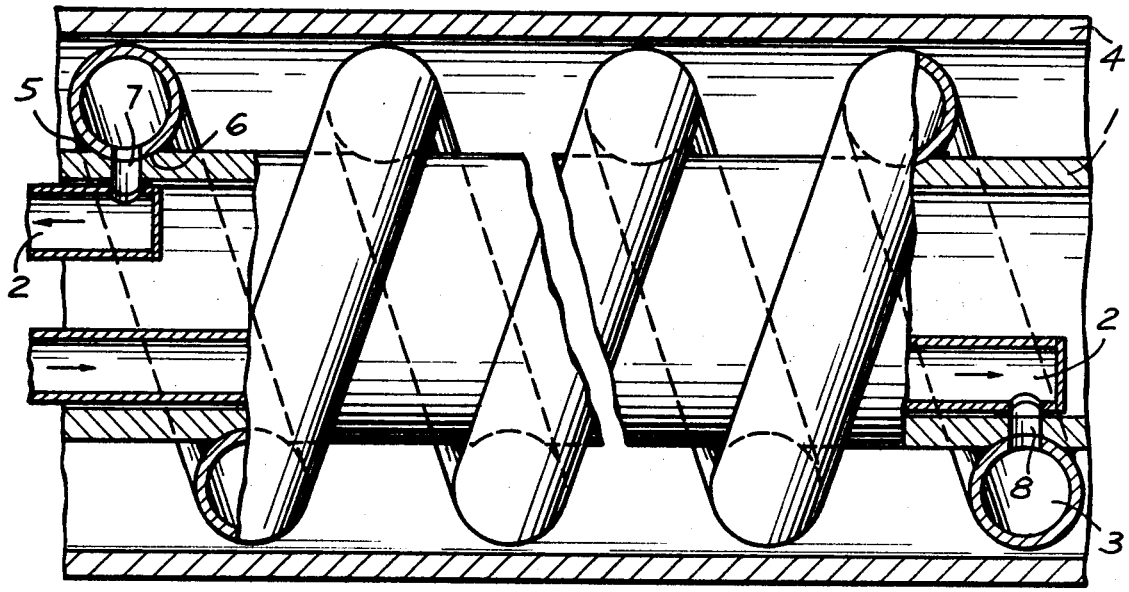
FIG. 1 is a lengthwise diagrammatic fragmentary view, partly in section, of a heat exchanger including a single screw with hollow screw turns according to the invention.

Referring now to the figures more in detail, the heat exchanger as exemplified in FIG. 1 comprises a hollow screw shaft 1 rotatably mounted in a suitable and conventional manner (not shown) in a housing shown as drum 4. The screw turns on the shaft are formed by spirally winding about the shaft a seamless tube 3 of circular cross section. As it is indicated at 5 the screw turns are secured to the outer peripheral wall of the shaft by welding joints. Other suitable and conventional fastening means may, of course, be used. To facilitate and strengthen the joint between the screw turns and the shaft, a shallow spiral groove 6 may be formed in the shaft wall in which the spirally wound tube 3 is seated as it is clearly shown in FIG. 1.

FIG. 1 also shows that shaft 1 is hollow and a conduit 2 is disposed therein. This conduit communicates through inlet and outlet ports 7 and 8 respectively, with the tube for feeding a suitable heat exchange medium such as steam under pressure through the screw turns. Conduit 2 should be visualized as being connected to a suitable supply for such medium.

Figure 2:
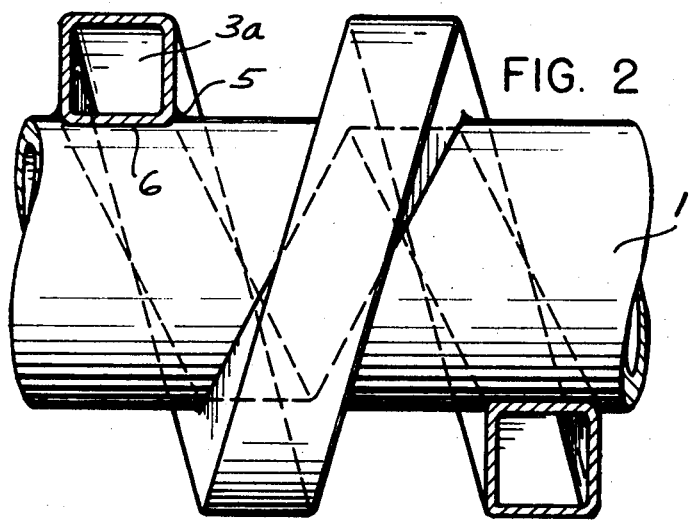
FIG. 2 is a lengthwise fragmentary view of the screw with hollow screw turns having a cross sectional outline different from that shown in FIG. 1.

FIG. 2 shows a structure similar to FIG. 1 except that the spirally wound seamless tube 3a has a rectangular cross section such as a square cross section.

Figure 3:
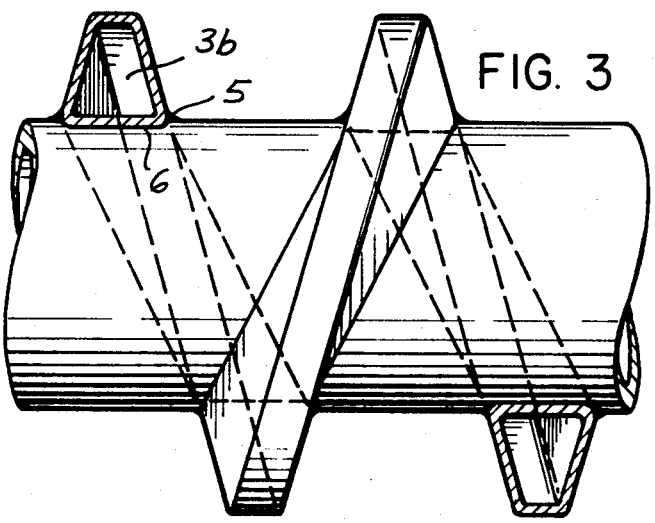
FIG. 3 is a lengthwise fragmentary view similar to FIG. 2 showing still another cross sectional outline of the screw turns.

FIG. 3 shows a seamless tube 3b with a trapezoidal cross section.

Many other cross sectional configurations of the seamless tube may be readily visualized. The shape of the cross sections is, of course, selected in accordance with the specific purpose for which the heat exchanger is designed.

Figure 4:
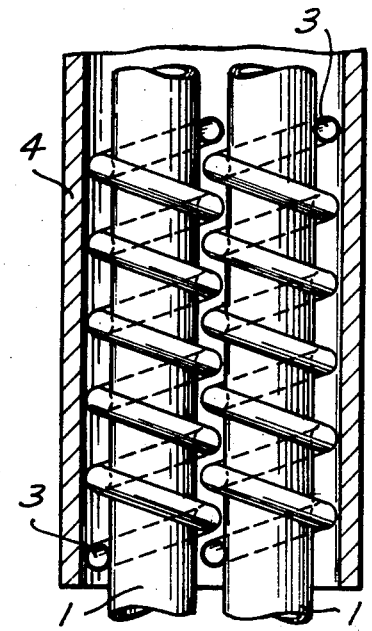
FIG. 4 is a lengthwise fragmentary diagrammatic view, partly in section, of a heat exchanger including two screws with hollow screw turns similar to the turns of the screw shown in FIG. 1.

FIG. 4 shows a heat exchanger of the type shown in FIG. 1 and described in detail in connection therewith, except that two screws with hollow screw threads are provided. The screws are rotatable parallel to each other and in mesh. The heat exchanger as shown in FIG. 4 is designed for unidirectional rotation of the two screws. More than two screws can, of course, be used, if desirable.

As it is clearly shown in all the figures, the pitch of the turns is such that axial portions of the shaft are exposed. Accordingly, the screw turns formed by the tube are defined by the outer walls thereof and the exposed portions of the shaft.

The depth of the engagement of the meshing turns of the two screws is selected in accordance with the special purpose for which the heat exchanger is intended. The play between meshing screw turns can be reduced so much that there is a practically point-like contact. With such narrow play it may be necessary or at least advisable, to machine the screw turns by shaving or turning.

A heat exchanger with twin screws can be conveniently heat controlled by feeding a heat exchange medium such as steam under pressure through the shafts and the hollow screw turns as previously described. As also previously described, the screws of the heat exchanger are practically free of internal stresses and tensions and are, hence, very robust so that processes can be safely carried out in which the material to be treated may be subjected to powerful shear forces.

If necessary or desirable, the screw turns and possibly also the bearings for the shaft can be armored with hard metal or other suitable material.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A heat exchanger screw with hollow screw turns comprising:
    a shaft;
    an elongate seamless tubular member spirally would about said shaft in contact therewith along a spiral strip, said tubular member forming a plurality of screw turns axially spaced on the shaft; and
    a welding joint fixedly securing said screw turns to the shaft only at and along said spiral strip, the outer wall of said tube and the shaft portions between the windings thereof defining continuous screw turns.

2. The heat exchanger screw according to claim 1 wherein said tubular member has a circular cross section.

3. The heat exchanger screw according to claim 1 wherein said tubular member has a rectangular cross section.

4. The heat exchanger screw according to claim 1 wherein said tubular member has a trapezoidal cross section.

5. The heat exchanger screw according to claim 1 wherein said shaft is a hollow shaft, and conduit means within said hollow shaft are connected by an inlet port and an outlet port with the space within said tubular member for conducting a heat exchange medium through the screw turns formed by said member.

6. A screw-type heat exchanger comprising in combination:
    an elongate housing;
    a pair of shafts rotatably mounted in said housing parallel to each other;
    an elongate seamless tubular member spirally wound about each of said shafts in contact therewith along a spiral strip, said tubular members forming a plurality of screw turns on the shaft axially spaced thereon, the screw turns on said shafts being in mesh; and
    welding joints securing said screw turn to the shafts at and along said spiral strips only.

7. A heat exchanger screw with hollow screw turns comprising:
    a shaft;
    an elongate seamless tubular member spirally wound about said shaft in contact therewith along a spiral strip, said tubular member forming a plurality of screw turns axially spaced on the shaft; and
    a weld joint fixedly securing said screw turns on the shaft only at and along said spiral strip, the outer wall of said tube and the shaft portions between the windings thereof defining continuous screw turns, said shaft including a spiral shaped elongate continuous recess in its peripheral wall, the screw turns formed by said tubular member engaging said recess welded therein by said weld joint.

* * * * *